United States Patent
Zhang et al.

(10) Patent No.: US 8,316,269 B2
(45) Date of Patent: Nov. 20, 2012

(54) HARQ FEEDBACK CHANNEL INDEXING SCHEME IN WIRELESS COMMUNICATION SYSTEMS

(75) Inventors: Yujian Zhang, Beijing (CN); Hujun Yin, Saratoga, CA (US); Yi Hsuan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 430 days.

(21) Appl. No.: 12/624,049

(22) Filed: Nov. 23, 2009

(65) Prior Publication Data

US 2010/0275081 A1   Oct. 28, 2010

Related U.S. Application Data

(60) Provisional application No. 61/173,204, filed on Apr. 28, 2009.

(51) Int. Cl.
*G06F 11/00* (2006.01)

(52) U.S. Cl. ............... 714/748; 714/749; 714/750

(58) Field of Classification Search ........... 714/748–751
See application file for complete search history.

(56) References Cited

U.S. PATENT DOCUMENTS

| | | | | |
|---|---|---|---|---|
| 7,697,491 B2* | 4/2010 | Nakajima et al. | ............ | 370/338 |
| 7,792,067 B2* | 9/2010 | Sheu et al. | ............ | 370/311 |
| 8,051,354 B2* | 11/2011 | Ma et al. | ............ | 714/748 |
| 2005/0201325 A1* | 9/2005 | Kang et al. | ............ | 370/328 |
| 2009/0083601 A1 | 3/2009 | Gorokhov et al. | | |
| 2009/0100310 A1 | 4/2009 | Yoo et al. | | |
| 2009/0181689 A1* | 7/2009 | Lee et al. | ............ | 455/450 |
| 2009/0201865 A1* | 8/2009 | Uemura et al. | ............ | 370/329 |
| 2009/0276676 A1* | 11/2009 | Lee et al. | ............ | 714/749 |
| 2011/0029833 A1* | 2/2011 | Zhang et al. | ............ | 714/749 |

FOREIGN PATENT DOCUMENTS

| | | |
|---|---|---|
| WO | 2010/129353 A2 | 11/2010 |
| WO | 2010/129353 A3 | 2/2011 |

OTHER PUBLICATIONS

International Preliminary Report on Patentability received for International Patent Application No. PCT/US2010/032808, mailed Nov. 10, 2011, 6 pages.

"Part 16. Air Interface for Fixed and Mobile Broadband Wireless Access Systems", DRAFT Amendment to IEEE Standard for Local and metropolitan area networks. Advanced Air Interface. IEEE P802 16m/D4, Feb. 2010, 797 pages. (Relevant part in the document is 1 Line 27-40 in p. 442, section 16.3.6.3.2.2. and 1 Line 15-26 in p. 598 section 16.3.8.3.4).

International Search Report and Written Opinion Received for PCT Patent Application No. PCT/US2010/032808, mailed on Nov. 30, 2010, 9 pages.

* cited by examiner

*Primary Examiner* — Scott Baderman
*Assistant Examiner* — Elmira Mehrmanesh
(74) *Attorney, Agent, or Firm* — Carrie A. Boone, P.C.

(57) ABSTRACT

An enhanced semi-explicit solution for HARQ feedback channel indexing in wireless communication systems is disclosed. The HARQ feedback channel indexing method may be applied to the HARQ feedback channel transmitted in the downlink, as well as the HARQ feedback channel transmitted in the uplink.

17 Claims, 7 Drawing Sheets

Figure 2
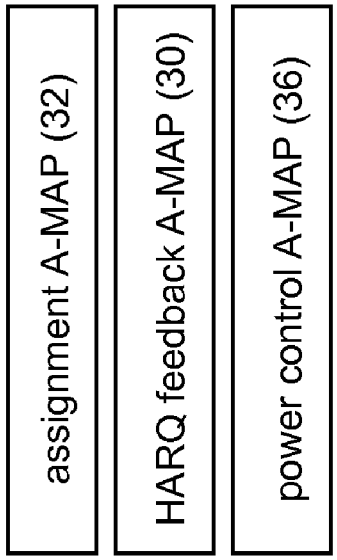

HARQ FEEDBACK CHANNEL INDEXING SCHEME IN WIRELESS COMMUNICATION SYSTEMS

CROSS-REFERENCE TO RELATED APPLICATIONS

This application claims priority under 35 U.S.C. 119(e) to United States Provisional Patent Application Number 61/173,204, entitled, "ADVANCED WIRELESS COMMUNICATION SYSTEMS AND TECHNIQUES", filed on Apr. 28, 2009.

TECHNICAL FIELD

This application relates to IEEE 802.16m and, more particularly, to Hybrid Automatic Repeat Requests (HARQ) under the IEEE standard.

BACKGROUND

Hybrid automatic repeat request (HARQ) is widely supported in current state-of-the-art wireless communication standards. Under automatic repeat request (ARQ), error detection information is added to data before transmission, ensuring that the receiver is able to decode the data. With HARQ, additional forward error correction (FEC) bits are also added to the data.

Several wireless communication standards are defined by the Institute of Electrical and Electronics Engineers (IEEE), including 802.16e (broadband wireless access) and 802.16m (advanced air interface standard). IEEE 802.16e is referred to herein as "802.16e" or "broadband wireless access standard"; IEEE 802.16m is referred to herein as "802.16m" or "advanced air interface standard".

During a HARQ operation, the HARQ feedback channel is used. A schematic depiction of the differences between the two standards for the HARQ feedback channel is depicted in FIG. 1. The HARQ feedback channel carries either a positive acknowledgement (ACK) or a negative acknowledgement (NACK), depending on the decoding result of the data burst. For the 802.16e broadband wireless standard, the HARQ feedback channel is known as ACKCH 10. For the 802.16m advanced air interface standard, the HARQ feedback channel is known as the HARQ feedback control channel 20 when transmitted in the uplink, and the HARQ Feedback A-MAP (HF-A-MAP) 30 when transmitted in the downlink.

In the current 802.16m standard, the advanced MAP (A-MAP) carries unicast service control information. Unicast service control information consists of user-specific control information and non-user-specific control information. User-specific control information is further divided into assignment information, HARQ feedback information, and power control information, transmitted in the assignment A-MAP 32, HARQ feedback A-MAP 30, and power control A-MAP 36, respectively, as depicted in FIG. 2. The HARQ feedback A-MAP 30 is the HARQ feedback channel under 802.16m in the downlink (FIG. 1). Non-user-specific control information is transmitted in non-user-specific A-MAP 38.

There is a set of HARQ feedback channel resources allocated and one method is needed to specify how to associate the HARQ feedback channel with the data burst, known as HARQ feedback channel indexing.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIG. 2 is a schematic diagram of channels used by the HARQ feedback channel indexing method, according to the prior art;

DETAILED DESCRIPTION

In accordance with the embodiments described herein, an enhanced semi-explicit solution for HARQ feedback channel indexing in wireless communication systems is disclosed. The HARQ feedback channel indexing method may be applied to the HARQ feedback channel transmitted in the downlink, as well as the HARQ feedback channel transmitted in the uplink.

There exist three approaches for HARQ feedback channel indexing: the explicit approach, the implicit approach, and the semi-explicit approach. Under the explicit approach, the full HARQ feedback channel index is specified within the set in downlink control signaling (the assignment A-MAP 32 for 802.16m). With the implicit approach, the HARQ feedback channel index is associated with some transmission parameters, but the index is not used in downlink control signaling. The associated transmission parameters may include a data burst resource index, a control channel index, and so on.

Using the semi-explicit approach involves signaling a partial HARQ feedback channel index, which combines with other transmission parameters to form the full HARQ feedback channel index. The benefit of the semi-explicit approach is that signaling overhead may be saved, as compared with the explicit approach.

The 802.16e standard supports both the explicit and the implicit approaches for obtaining the HARQ feedback channel index. In 802.16m, the HARQ feedback channel index may be determined by signaling the index explicitly, as one example. Such explicit signaling results in a large overhead in control signaling. The HARQ feedback channel indexing scheme provides an efficient way to transmit the HARQ feedback channel index with minimized control overhead.

Figure 3:
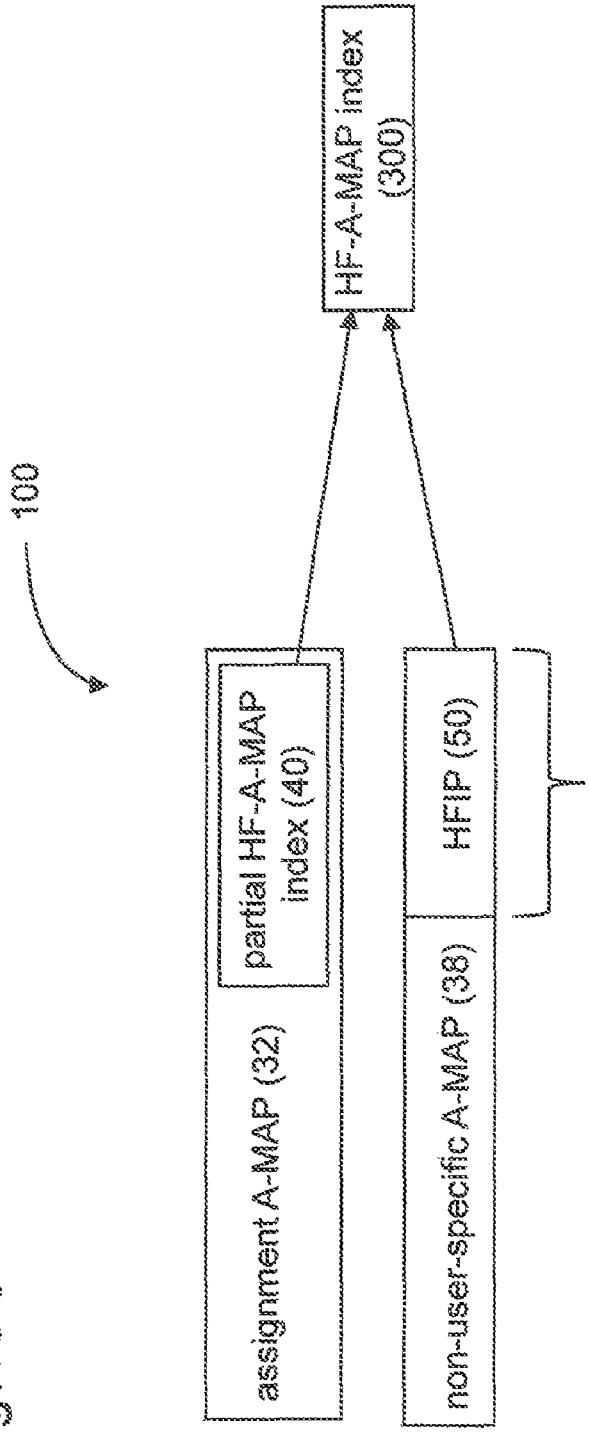
FIG. 3 is a schematic diagram of a HARQ feedback index parameter to be added to a non-user-specific A-MAP, used by the HARQ feedback channel index method of FIG. 2, according to some embodiments.

FIG. 3 depicts the mechanics of a HARQ feedback channel indexing method 100, according to some embodiments. The HARQ feedback channel indexing method 100 employs an added field in the non-user- specific control channel (non-user-specific A-MAP 38 for 802.16 m). In FIG. 3, the non-user-specific A-MAP 38 (also in FIG. 2) is appended with a field 50, known as a HARQ feedback index parameter (HFIP). The HFIP field 50 is used to indicate the choice of how to derive the HARQ feedback channel index based on selected transmission parameter(s) and the partial index signaled on downlink control signaling (assignment A-MAP 32 for 802.16 m). In some embodiments, the HFIP field 50 has $N_{HFIP}$ bits.

The choices provided in the HFIP 50 are focused on how to select and/or transform transmission parameters in the HARQ feedback channel index calculation. In some embodiments, there are two options for implementing the HFIP 50. In a first option, known herein as option A, there are multiple transmissions parameters and the HFIP 50 indicates a subset of transmission parameters to use. In a second option, known herein as option B, a single transmission parameter is used and the HFIP 50 indicates which part of the single parameter is used.

In some embodiments, option A is further subdivided into options A1 and A2. In option A1, one transmission parameter is selected as a baseline, such as, for example, the station identifier (STID) parameter. Under option A1, the selected baseline parameter is always used when calculating the HARQ feedback channel index. Thus, the HFIP field 50 is used to indicate the combination of other parameters to also be used in calculating the HARQ feedback channel index. One example of how the 2-bit HFIP 50 may be implemented is given in Table 1, below.

TABLE 1

HARQ feedback index parameter - option A1

| 2-bit HFIP j | parameter set M(j) | | |
|---|---|---|---|
| | STID | resource | MCS |
| 00 | ■ | □ | □ |
| 01 | ■ | □ | ■ |
| 10 | ■ | ■ | □ |
| 11 | ■ | ■ | ■ |

In this example, assume the value signaled in the HFIP 50 is j, and the corresponding parameter set, M(j)={$m_i$}. In this example, the STID parameter is always used, the most significant bit (MSB) indicates whether the resource index parameter is used or not while the least significant bit (LSB) indicates whether the MCS parameter is used or not. For example, when the HFIP 50 is 2 (10 binary), the MSB is 1 and the LSB is 0, indicating that, in addition to the STID parameter being used, the resource index parameter is also used (but the MCS parameter is not used) to calculate the HARQ feedback channel index.

Alternatively, in option A2, no parameter is baseline. The HFIP 50 thus indicates the combination of all parameters used to calculate the HARQ feedback channel index. A value of zero in the HFIP 50 may indicate that no parameter is used, or a zero value may indicate a special combination of parameters. One instance of using option A2 to calculate the HARQ feedback channel index is illustrated in Table 2 below.

TABLE 2

HARQ feedback index parameter - option A2

| 2-bit HFIP j | parameter set M(j) | | |
|---|---|---|---|
| | STID | resource | MCS |
| 00 | ■ | □ | ■ |
| 01 | ■ | □ | □ |

TABLE 2-continued

HARQ feedback index parameter - option A2

| 2-bit HFIP j | parameter set M(j) | | |
|---|---|---|---|
| | STID | resource | MCS |
| 10 | □ | ■ | □ |
| 11 | ■ | ■ | □ |

In this example, the MSB indicates whether the resource index parameter is used or not while the LSB indicates whether the STID parameter is used or not. For example, when the HFIP 50 value is 2 (10 binary), the MSB is 1 and the LSB is 0, therefore, the resource index parameter is used to calculate the HARQ feedback channel index, but the STID parameter is not used. Note that a HFIP 50 of zero indicates that both the STID and MCS parameters are used to calculate the HARQ feedback channel index.

Option B may be used when a single parameter is used to calculate the HARQ feedback channel index, in some embodiments. In this case, the HARQ feedback channel index parameter indicates which part of a single transmission parameter is used to calculate the HARQ feedback channel index. In Option B, assume that the STID parameter is used. In some embodiments, a right shift operator (>>) is used to select the part of the STID parameter used to calculate the HARQ feedback channel index. Right shift operation a>>b=$\lfloor a/2^b \rfloor$ where $\lfloor x \rfloor$ is the floor of x, in other words, the largest integer less than or equal to x. For example, 15>>1=7, 15>>2=3. In Option B, assume the value of the HFIP 50 is j, then, STID>>(j*sf) can be used to select part of the STID parameter, where sf is the scaling factor, which may either be configured in the system or specified in the standard. Possible values for sf may be 1, 2, and so on.

Figure 1:
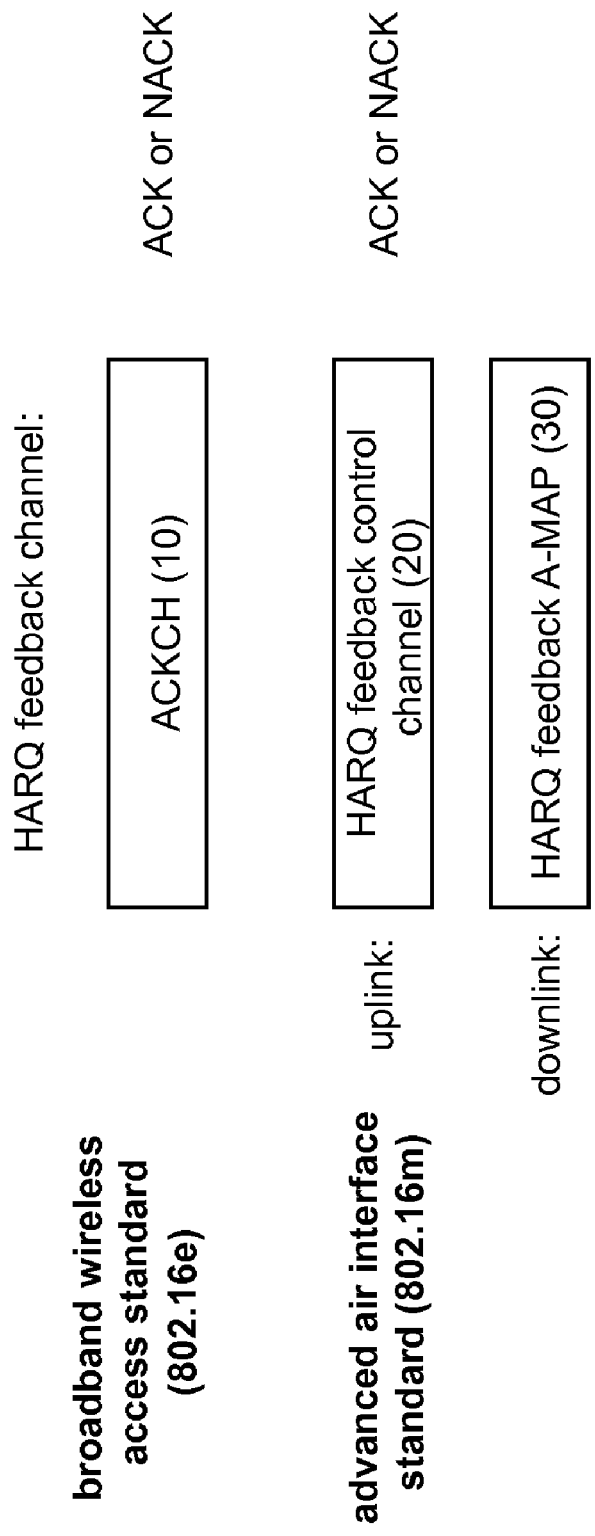
FIG. 1 is a schematic diagram of a HARQ feedback channel under both the broadband wireless access and advanced air interface standards, according to the prior art.

For option A1 described above, FIG. 4 shows a simple mechanism, using a modulo operation, for calculating the HARQ feedback channel index, in some embodiments. (Similarly, FIG. 5 shows the flow of calculations where option B is used.) For example, for the HARQ feedback A-MAP (HF-A-MAP) 30 transmitted in the downlink (FIG. 1), assume that:

the partial HF-A-MAP index 40 signaled in the assignment A-MAP 32 is n (block 102)

the total number of HF-A-MAPs configured is $N_{HF-A-MAP}$ (block 104) the HFIP 50 value is j (block 106)

Figure 4:
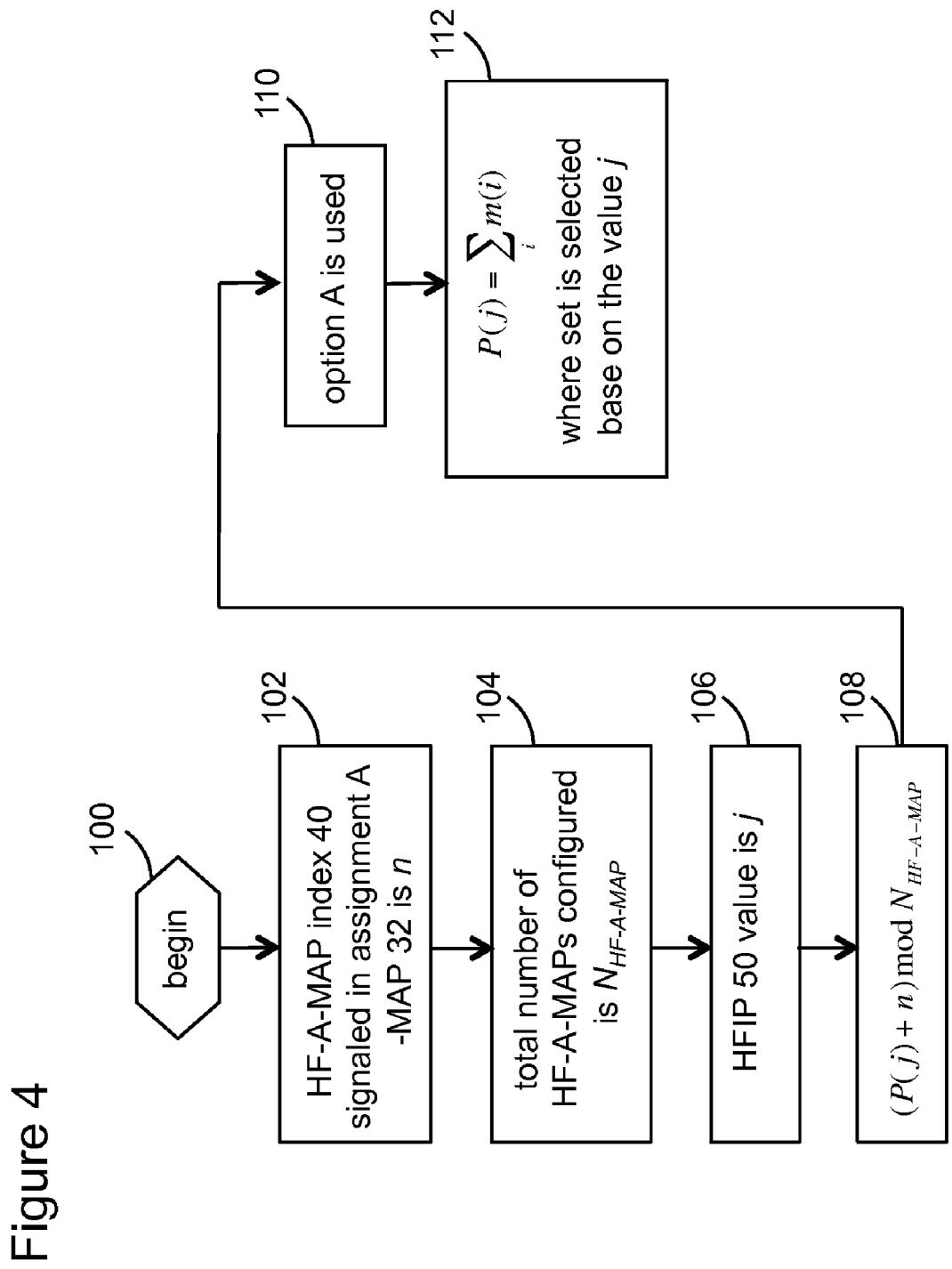
FIG. 4 is a flow diagram showing operations of the HARQ feedback channel indexing method in implementing option A, according to some embodiments.
Figure 5:
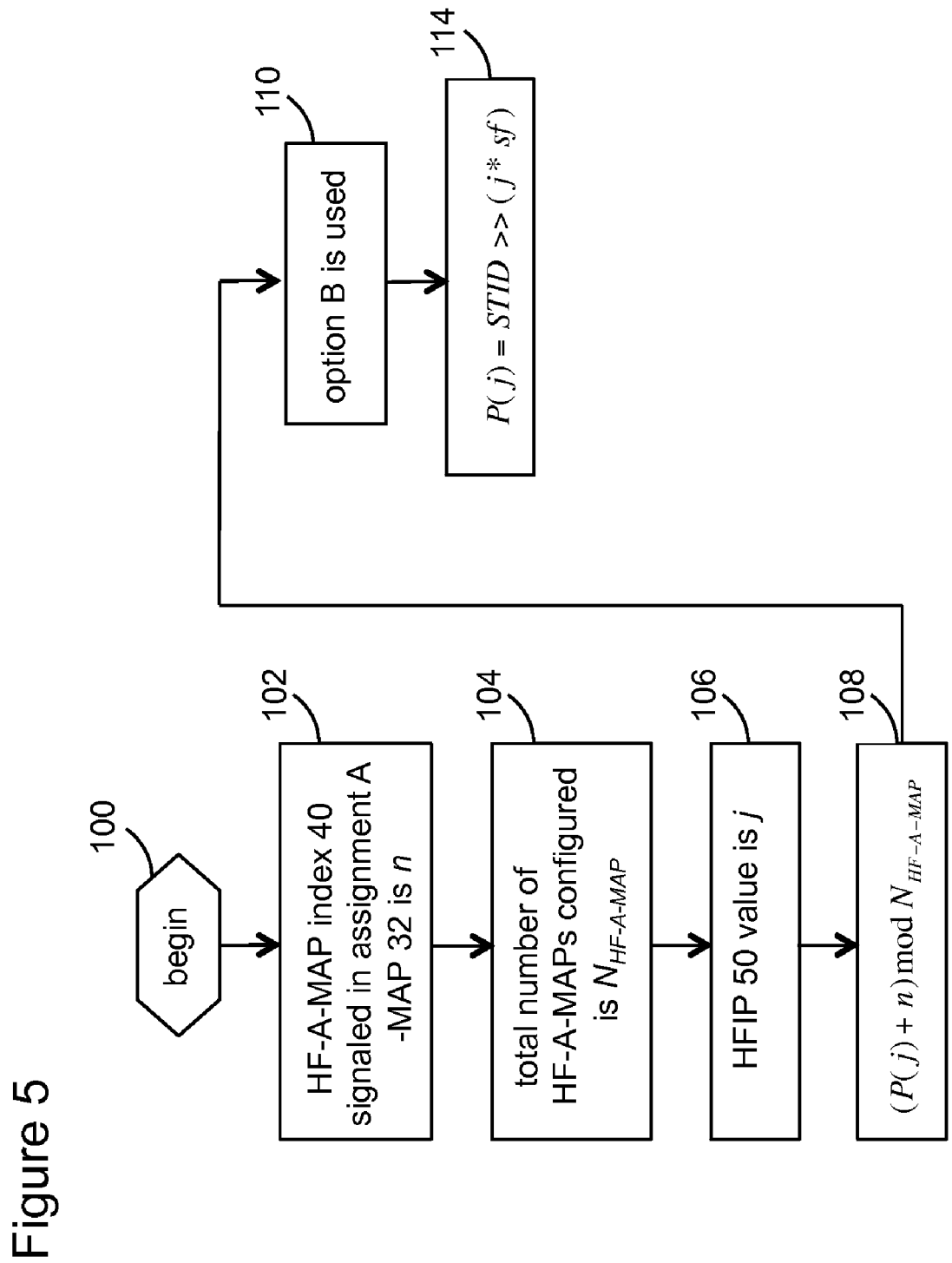
FIG. 5 is a flow diagram showing operations of the HARQ feedback channel indexing method in implementing option B, according to some embodiments.

Then, an associated full HF-A-MAP index 300 is given by:

$$(P(j)+n) \mod N_{HF-A-MAP},$$

as shown in FIG. 4 (block 108), where (j) is a function of j and is used according to the options described above:

Option A:

$$P(j) = \sum_i m(i),$$

where set {$m_i$} is selected base on the value j (block 112)

Option B: P(j)=STID>>(j*sf)(FIG. 5)

For example, assume that option A1 is used, in other words, a full HF-A-MAP index 300 is calculated $$\left(\sum_i m_i + n\right) \mathrm{mod} N_{HF\text{-}A\text{-}MAP}.$$

Assume $N_{HF\text{-}A\text{-}MAP}=16$, $j=2$, $n=1$, the resource index parameter $=15$, and the STID parameter $=334$. Since $j=2$, the STID and resource index parameters are used to calculate a full HF-A-MAP index 300 according to Table 1. Therefore, using the above summation equation, the full HF-A-MAP index 300 is (15+334+1) mod 16=14.

Figure 6:
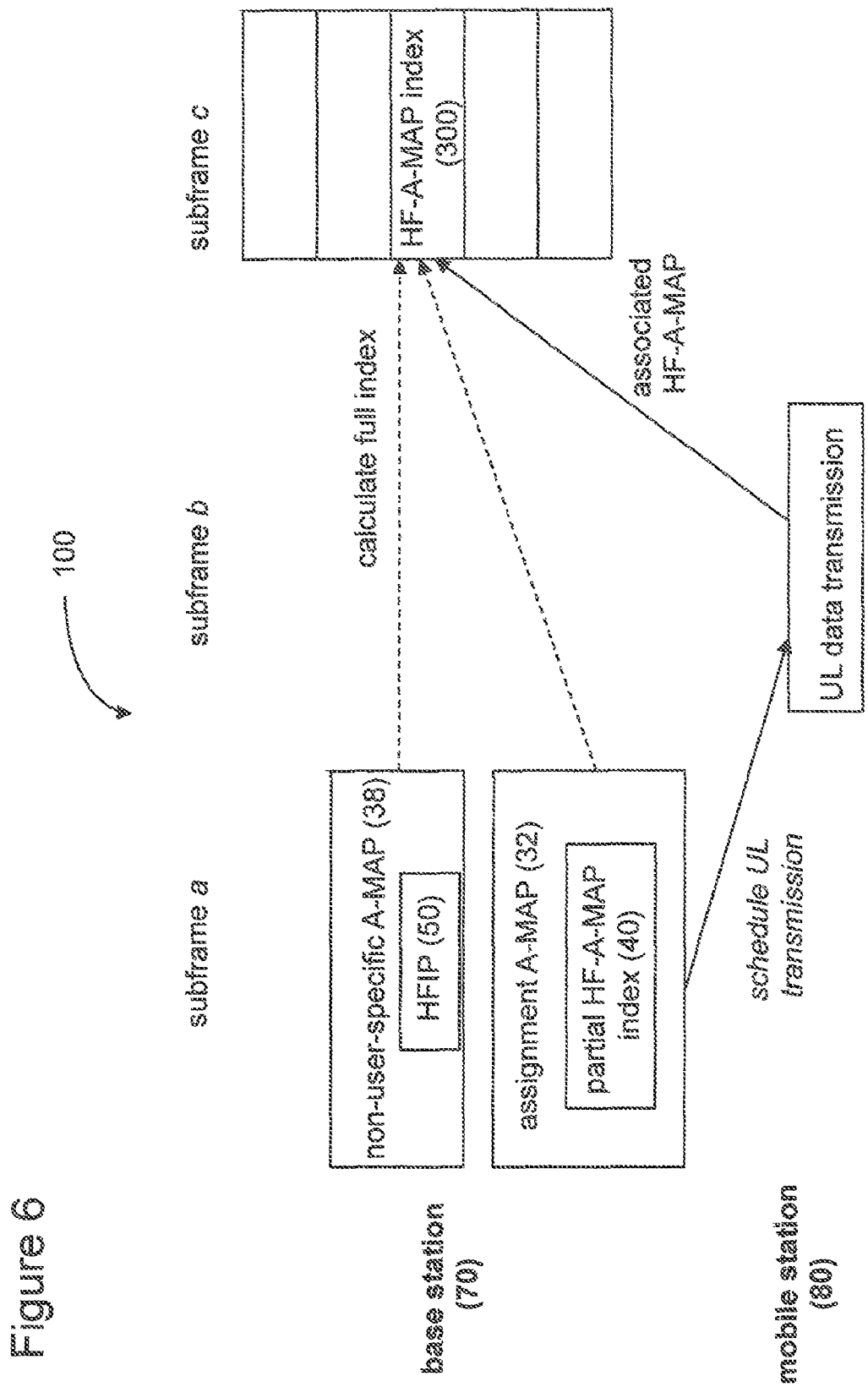
FIG. 6 is a schematic diagram of base station and mobile station operation for HARQ feedback A-MAP in the downlink, according to some embodiments.

Base station 70 and mobile station 80 operations for calculating the HF-A-MAP index 300 by the HARQ feedback channel indexing method 100 are illustrated schematically in FIG. 6, according to some embodiments. In a first sub-frame, denoted sub-frame a, a base station 70 transmits the non-user-specific A-MAP 38 and the assignment A-MAP 32 to a mobile station 80. The non-user-specific A-MAP 38 contains the HFIP field 50 while the assignment A-MAP 32 contains the partial HF-A-MAP index 40. The mobile station 80 follows the scheduling in assignment A-MAP targeted for it and transmits uplink data in a subsequent sub-frame, denoted sub-frame b. According to the HFIP field 50 and the partial HF-A-MAP index 40, both the base station 70 and the mobile station 80 may calculate a full HF-A-MAP index 300 according to methods described herein. Therefore, the base station 70 may transmit the associated HF-A-MAP according to the calculated index and the mobile station 80 then receives the said HF-A-MAP according to the calculated index 300.

The HARQ feedback channel indexing method 100 thus provides a mechanism by which the index for the HARQ feedback channel is transmitted explicitly. By adding a single field in the non-user-specific control channel (the non-user-specific A-MAP 38), the choice of how to derive the HARQ feedback channel index is conveyed, based on selected transmission parameter(s) and the partial index signaled on the downlink control signaling (the partial HF-A-MAP index 40 in the assignment A-MAP 32). Current solutions do not permit different mechanisms for deriving the HARQ feedback channel index, as is proposed herein, in some embodiments.

The HARQ feedback channel indexing method provides an apparatus and method for HARQ feedback channel indexing in wireless communication systems. In some embodiments, apparatus would include a base station scheduler, a base station HF-A-MAP transmitter, a mobile station HF-A-MAP receiver, a mobile station HARQ feedback channel transmitter, and so on. In 802.16m, the HARQ feedback channel index should be determined. One way is to signal the index explicitly. However, this results in large overhead in control signaling. The HARQ feedback channel indexing method provides an efficient way to transmit HARQ feedback channel index with minimized control overhead.

Figure 7:
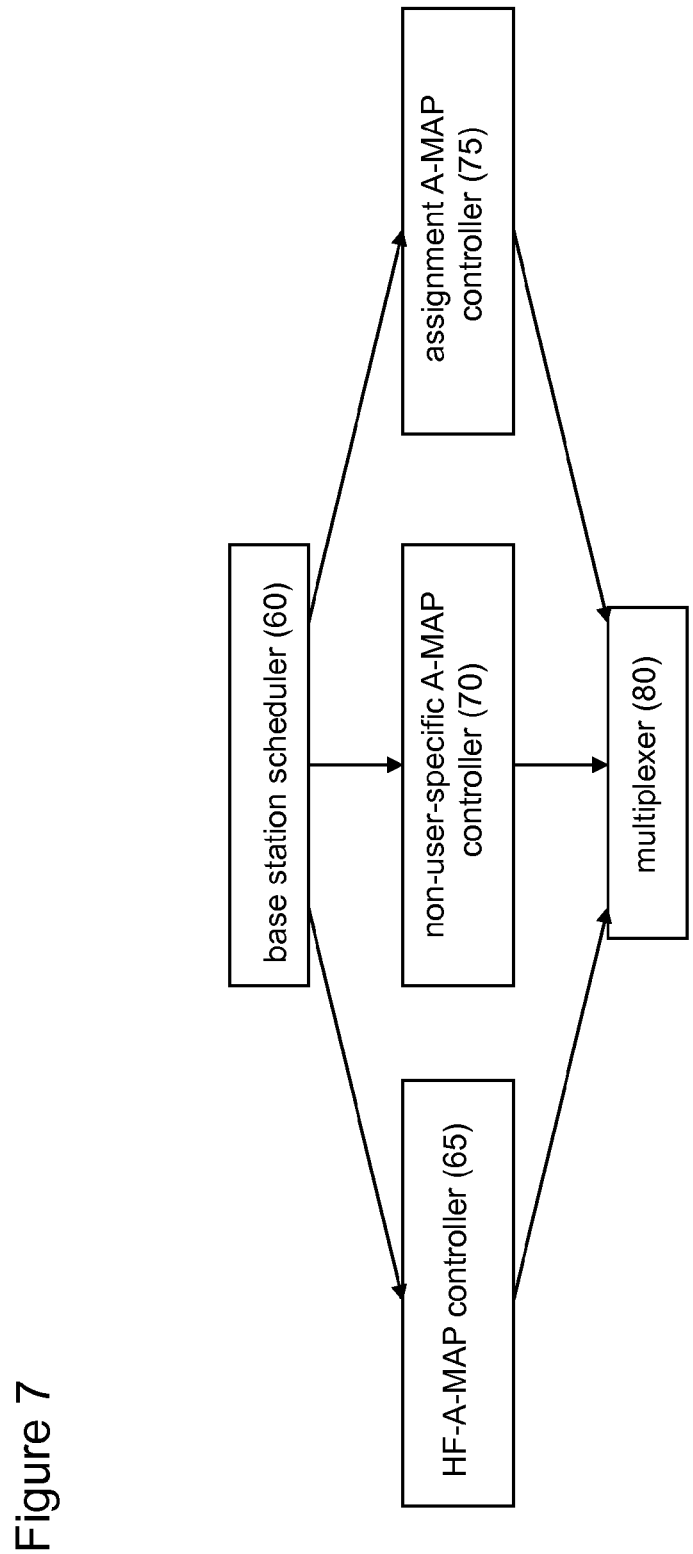
FIG. 7 is a schematic diagram of a HARQ feedback channel indexing apparatus, according to some embodiments.

FIG. 7 is a schematic block diagram of a HARQ feedback channel indexing base station side apparatus 200, according to some embodiments. Using an HF-A-MAP controller 65, a non-user-specific A-MAP controller 70, and an assignment A-MAP controller 75, the base station scheduler 60 calculates and sets the values for the HFIP 50, the partial HF-A-MAP index 40, and related parts. The associated bits that make up the HF-A-MAP index 300 are then multiplexed by the multiplexer 80 and transmitted to the mobile station during downlink transmission.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A method to perform hybrid automatic repeat request (HARQ) indexing, the method comprising:
   transmitting a non-user-specific advanced map (A-MAP) comprising a HARQ feedback index parameter (HFIP) to a mobile station in a first sub-frame, wherein the A-MAP contains unicast service control information;
   transmitting an assignment A-MAP comprising a partial HARQ feedback A-MAP (HF-A-MAP) index to the mobile station in the first sub-frame;
   receiving uplink data in a second sub-frame from the mobile station according to scheduling in the assignment A-MAP targeted for the mobile station; and
   calculating a full HARQ feedback index using both the HFIP and the partial HARQ feedback A-MAP index by calculating (P(j)+n)mod $N_{HF\text{-}A\text{-}MAP}$, (where j is the value found in the HFIP, P(j) is a function of j, n is the value found in the partial HF-A-MAP index, and $N_{HF\text{-}A\text{-}MAP}$ is the total number of HF-A-MAPs configured.

2. The method of claim 1, solving the equation, (P(j)+n) mod $N_{HF\text{-}A\text{-}MAP}$, further comprising:
   calculating, wherein set $\{m_i\}$ is selected base on the value j.

3. The method of claim 2, wherein one transmission parameter is selected as a baseline parameter, wherein the baseline parameter is used to calculate the HARQ feedback channel index.

4. The method of claim 2, wherein no transmission parameter is selected as a baseline parameter.

5. The method of claim 1, solving the equation, (P(j)+n) mod $N_{HF\text{-}A\text{-}MAP}$, further comprising:
   calculating P(j)=TP>>(j* sf), wherein sf is a scaling factor and TP is a transmission parameter.

6. A method to perform hybrid automatic repeat request (HARQ) indexing, the method comprising:
   receiving a non-user-specific advanced map (A-MAP) comprising a HARQ feedback index parameter (HFIP) from a base station in a first sub-frame, wherein the A-MAP contains unicast service control information;
   receiving an assignment A-MAP comprising a partial HARQ feedback A-MAP (HF-A-MAP) index from the base station in the first sub-frame;
   transmitting uplink data in a second sub-frame to the base station according to scheduling in the assignment A-MAP; and
   calculating a full HARQ feedback index using both the HFIP and the partial HARQ feedback A-MAP index as follows:
      calculating (P(j)+n)mod $N_{HF\text{-}A\text{-}MAP}$, where j is the value found in the HFIP, P(j) is a function of j, n is the value found in the partial HF-A-MAP index, and $N_{HF\text{-}A\text{-}MAP}$ is the total number of HF-A-MAPs configured.

7. The method of claim 6, solving the equation, (P(j)+n) mod $N_{HF\text{-}A\text{-}MAP}$, further comprising:
   calculating, wherein set $\{m_i\}$ is selected base on the value j.

8. The method of claim 7, wherein one transmission parameter is selected as a baseline parameter, wherein the baseline parameter is used to calculate the HARQ feedback channel index.

9. The method of claim 7, wherein no transmission parameter is selected as a baseline parameter.

10. The method of claim 6, solving the equation, (P(j) +n)mod $N_{HF\text{-}A\text{-}MAP}$, further comprising:

calculating $P(j)=TP\gg(j*sf)$, wherein sf is a scaling factor and TP is a transmission parameter.

11. A system to calculate a hybrid automatic repeat request (HARQ) feedback channel index, the system comprising:
- a non-user-specific advanced map controller comprising a HARQ feedback index parameter (HFIP); and
- an assignment advanced map controller comprising a partial HARQ advanced map (HF-A-MAP) index;

wherein a full HARQ feedback channel index is obtained from the HFIP and the partial HF-A-MAP index using the following formula:

$$(P(j)+n) \bmod N_{HF\text{-}A\text{-}MAP},$$

wherein j is the value found in the HFIP, P(j) is a function of j, n is the value found in the partial HF-A-MAP index, and $N_{HF\text{-}A\text{-}MAP}$ is the total number of HF-A-MAPs configured.

12. The system of claim 11, wherein the HFIP is a two-bit value.

13. The system of claim 11, wherein there are multiple transmission parameters and the HFIP indicates a subset of transmission parameters to use to calculate the full HARQ feedback channel index.

14. The system of claim 13, wherein one of the subset of transmission parameters is a baseline parameter and the HFIP indicates a subset of the remaining transmission parameters to use, along with the baseline parameter, to calculate the full HARQ feedback channel index.

15. The system of claim 11, wherein a single transmission parameter is used to calculate the full HARQ feedback channel index and the HFIP indicates what portion of the single transmission parameter is used to perform the calculation.

16. The system of claim 11, wherein the full HARQ feedback channel index is obtained by performing a right-shifting operation on the HFIP.

17. The system of claim 11, wherein the full HARQ feedback channel index is obtained using a scaling factor.

\* \* \* \* \*

UNITED STATES PATENT AND TRADEMARK OFFICE
CERTIFICATE OF CORRECTION

PATENT NO. : 8,316,269 B2  
APPLICATION NO. : 12/624049  
DATED : November 20, 2012  
INVENTOR(S) : Yujian Zhang et al.

Page 1 of 1

It is certified that error appears in the above-identified patent and that said Letters Patent is hereby corrected as shown below:

On the title page, item (56), in column 2, under "Other Publications", line 2, delete "mailed" and insert -- mailed on --, therefor.

In column 6, line 18, in claim 1, delete "(where" and insert -- where --, therefor.

In column 6, line 23, in claim 2, delete "claim 1 ," and insert -- claim 1, --, therefor.

In column 6, line 24, in claim 2, delete "calculating ," and insert -- calculating, --, therefor.

In column 6, line 51, in claim 6, delete "$N_{HF-A-MAP}$,where" and insert -- $N_{HF-A-MAP}$, where --, therefor.

In column 6, line 58, in claim 7, delete "calculating ," and insert -- calculating, --, therefor.

In column 6, line 67, in claim 10, delete "(P(j) +n)mod" and insert -- (P(j)+n)mod --, therefor.

Signed and Sealed this  
Twenty-sixth Day of March, 2013

Teresa Stanek Rea  
*Acting Director of the United States Patent and Trademark Office*